US006301198B1

(12) United States Patent
Otaka et al.

(10) Patent No.: US 6,301,198 B1
(45) Date of Patent: Oct. 9, 2001

(54) ELECTRONIC TIMEPIECE

(75) Inventors: Yukio Otaka, Tokorozawa; Rikoku Nakamura, Hoya; Shigeru Morokawa, Higashiyamato, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/367,088

(22) PCT Filed: Dec. 11, 1995

(86) PCT No.: PCT/JP98/05625

§ 371 Date: Aug. 9, 1999

§ 102(e) Date: Aug. 9, 1999

(87) PCT Pub. No.: WO99/30212

PCT Pub. Date: Jun. 17, 1999

(30) Foreign Application Priority Data

Dec. 11, 1997 (JP) .................................................. 9-341187

(51) Int. Cl.[7] ............................ G04B 1/00; G04C 3/00; H02J 7/10

(52) U.S. Cl. ............................................ 368/205; 320/101

(58) Field of Search .................................... 368/203–205; 320/101, 155–159, 161–164; 323/901

(56) References Cited

U.S. PATENT DOCUMENTS

| | | | |
|---|---|---|---|
| 4,291,266 | 9/1981 | Portmann | 320/2 |
| 4,453,119 | 6/1984 | Staler et al. . | |
| 4,785,435 | 11/1988 | Inoue et al. | 368/205 |

FOREIGN PATENT DOCUMENTS

| | | |
|---|---|---|
| 0 241 219 | 10/1987 | (EP) . |
| 0 701 184 A1 | 3/1996 | (EP) . |
| 2 020 495 | 11/1979 | (GB) . |
| 55-146083 | 11/1980 | (JP) . |
| 62-76690 | 5/1987 | (JP) . |
| 62-213306 | 9/1987 | (JP) . |
| 63-7388 | 1/1988 | (JP) . |
| 3-17593 | 1/1991 | (JP) . |

*Primary Examiner*—Vit Miska
(74) *Attorney, Agent, or Firm*—Armstrong, Westerman, Hattori, McLeland & Naughton, LLP

(57) ABSTRACT

In an electronic timepiece, in which electric power generated by a solar cell (101) is accumulated in an accumulator device (104) and a time keeping means (105) is driven with the accumulated electric power, an electrically on-off controllable switch (102) is provided in a circuit for charging the accumulator device (104) by the solar cell (101), a voltage comparison means (103) intermittently brings the switch (102) into the off-state at predetermined intervals and compares the generated voltage (Vs) by the solar cell and the accumulated voltage (Vb) in the accumulator device (104), and keeps the switch (102) in the off-state as it is when Vs≦Vb and brings the switch (102) into the on-state when Vs>Vb in accordance with the comparison result. Thereby, a reverse flow of an electric current from the accumulator device (104) can be prevented and a voltage drop on charging is eliminated, resulting in enhancement in charging efficiency.

6 Claims, 7 Drawing Sheets

ELECTRONIC TIMEPIECE

TECHNICAL FIELD

The present invention relates to an electronic timepiece provided with a solar cell as a power source.

BACKGROUND TECHNOLOGY

An electronic timepiece (especially wristwatch) with solar cell, in which electric power generated by a solar cell is accumulated in an electric power accumulation device (referred to as "accumulator device" hereinafter), and time keep and time display are performed with the accumulated electric power, has recently become widespread.

From the above it has been supposed that the convenience of freedom from trouble of battery replacement and the recent requirements to prevent environmental pollution due to battery waste, are supported by users of wristwatches.

The most basic configuration of a conventional electronic timepiece with solar cell is shown in FIG. 8.

In this electronic timepiece with solar cell, electric power generated by a solar cell 101 is accumulated in an accumulator device 104 and a time keeping means 105 is driven by the accumulated electric power. As the solar cell 101, a plurality of cells (generally about four cells) made by vapor deposition of an amorphous silicon thin film onto a substrate and connected in series, are widely used. As the accumulator device 104, a secondary cell (battery) is used.

The time keeping means 105 is an electronic timepiece module comprising a time keep counter circuit having a quartz oscillator circuit, an electric counter circuit (frequency dividing circuit) and the like, a digital display or hands and a drive mechanism thereof for displaying a time and the like, and so on.

A reverse flow preventing diode 802 is provided to prevent the accumulated electric power from decreasing due to a reverse flow of an electric current from the accumulator device 104 to the solar cell 101 in a state where the generated voltage by the solar cell 101 is low due to weak ambient light.

However, even if the reverse flow preventing diode 802 can serve to prevent leakage current in a state where the generated voltage by the solar cell 101 is low in low intensity of illumination as described above, it conversely has the disadvantage when the intensity of illumination is high and therefore the generated voltage by the solar cell 101 is high, a forward voltage drop of about 0.5 V due to the reverse flow preventing diode 802 produces a loss, which causes the charging efficiency of the accumulator device 104 to lower.

The influence of the voltage drop of about 0.5 V due to the reverse flow preventing diode 802 becomes a more significant problem in an electronic timepiece using a solar cell in which the number of cells connected in series (the number of divided surface electrodes) is few.

This is because the generated voltage by one cell of the solar cell is about 0.5 V, and it is multiplied by the number of cells connected in series to be a value of the generated voltage of the solar cell, therefore a solar cell having a small number of cells connected in series has a low output voltage. Especially in a single cell having the number of cells connected in series =1, almost all of the generated voltage by the solar cell 101 is consumed in a forward voltage drop of the reverse flow preventing diode 802, thereby operational conditions for charging the accumulator device 104 are not established.

For the accumulator device in such an electronic timepiece with solar cell, an accumulation means having a large capacitance is used so as to drive its time keeping means for a long time even in a state where the solar cell does not generate electric power. Therefore, there is a disadvantage in that in a state where the accumulated electric power has been almost totally consumed, it takes a long time after illuminating the solar cell again before enough electric power is accumulated in the accumulator device to cause the time keeping means to start its operation.

To solve the above disadvantage, there exists a quick start type electronic timepiece having a configuration in which a large capacitance accumulator device and a small capacitance accumulator device are provided in parallel, and when light is emitted to a solar cell to start generating electric power in a state where the accumulated electric power in the accumulator device has been almost totally consumed as described above, the small accumulator device is first charged by the generated electric power and then the time keeping means can start its driving in a short time with the accumulated electric power.

An example of the configuration is shown in FIG. 9. In the quick-start type electronic timepiece with solar cell, a small capacitance accumulator device (capacitor) 905 and a large capacitance accumulator device (secondary cell) 906 are connected in parallel to the solar cell 101 via reverse flow preventing diodes 901 and 902 in place of the accumulator device 104 shown in FIG. 8.

The small capacitance accumulator device 905 is directly connected to the time keeping means 105 in parallel, and a switch 903 for selecting an object to be charged is inserted between the large capacitance accumulator device 906 and the diode 902, and a switch 904 for selecting a power source is also inserted between the large capacitance accumulator device 906 and the time keeping means 105.

Furthermore, a voltage detection means 907 is provided in the above timepiece to detect the value of the accumulated voltage Vb of the large capacitance accumulator device 906 and to electrically control the on-off states of the switches 903 and 904 in accordance with the detection result. More specifically, when the accumulated voltage Vb of the large capacitance accumulator device 906 is below a preset value, the control of bringing the switch 903 into the on-off states at a predetermined ratio is repeated, thereby the small capacitance accumulator device 905 is quickly charged and the large capacitance accumulator device 906 is gradually charged. At this time, the switch 904 is kept in the off-state, thereby the time keeping means 105 is instantly driven with the accumulated electric power in the small capacitance accumulator device 905.

In a state where the accumulated voltage Vb of the large capacitance accumulator device 906 exceeds the preset value, the switches 903 and 904 are both kept in the on-states and the large capacitance accumulator device 906 is selected both as an object to be charged and as the power source of the time keeping means 105.

Also in this electronic timepiece, there is a disadvantage that since reverse flow preventing diodes 901 and 902 are provided in the respective charging paths of the small capacitance accumulator device 905 and the large capacitance accumulator device 906 to prevent leakage currents via the solar cell 101 in a weak ambient light, voltage drops occur due to the reverse flow preventing diodes 901 and 902 when charging with the generated electric power by the solar cell 101, which causes the charging efficiency for the respective accumulator devices 905 and 906 to be lower.

DISCLOSURE OF THE INVENTION

The present invention is made to solve the above disadvantages, and its object is to enhance the charging efficiency in an electronic timepiece with solar cell by eliminating a lowering of the charging efficiency by a reverse flow preventing diode while an accumulator device is charged by the solar cell.

The present invention, in an electronic timepiece having a solar cell and an accumulator device as described above, in which electric power generated by the solar cell is accumulated in the accumulator device and a time keeping means is driven with the accumulated electric power, comprises an electrically on-off controllable switch being provided in a circuit for charging the accumulator device by the solar cell to achieve the above object, in place of a conventional reverse flow preventing diode.

Moreover, provided is a voltage comparison means for comparing a generated voltage by the solar cell and an accumulated voltage in the accumulator device while the above-described switch is intermittently kept in an off-state at predetermined intervals, for storing the comparison result until the next voltage comparison timing, and for keeping the switch in the off-state when the generated voltage is smaller than the accumulated voltage and for bringing the switch into the on-state when the generated voltage is larger than the accumulated voltage.

Thereby, a reverse flow of an electric current from the accumulator device to the solar cell can be prevented and a voltage drop does not occur on charging from the solar cell to the accumulator device, so that the charging efficiency can be enhanced.

Incidentally, if a voltage comparison command signal is outputted from the aforesaid time keeping means to the voltage comparison means at predetermined intervals, the voltage comparison means can intermittently bring the switch into the off-state in synchronization with the voltage comparison command signal to perform the voltage comparison operation.

Moreover, the present invention, in a quick start type electronic timepiece having a solar cell, a first accumulator device with a small capacitance, and a second accumulator device with a large capacitance, in which electric power generated by the solar cell is accumulated in the first accumulator device and the second accumulator device and a time keeping means is driven with the accumulated electric power, comprises first and second switches each electrically on-off controllable being also interposed in circuits for charging the first and second accumulator devices by the solar cell respectively to achieve the above object. Moreover, a third electrically on-off controllable switch is interposed in a supply circuit to the time keeping means by the accumulator device with a large capacitance.

Furthermore, a voltage detection means, a voltage comparison means and a control signal generation circuit described later are provided to control the on-off states of the first, second and third switches.

The voltage detection means intermittently detects accumulated voltages in the accumulator devices at predetermined intervals to discriminate whether or not the accumulated voltages exceed preset values, and outputs a signal for bringing the third switch into the on-state when the accumulated voltages exceed the preset values and a signal for bringing the third switch into the off-state when the accumulated voltages do not exceed the preset values.

The voltage comparison means intermittently compares a generated voltage by the solar cell and a supply voltage to the time keeping means at predetermined intervals, and stores the comparison result until the next voltage comparison timing.

The control signal generation circuit outputs signals, based on the discrimination result by the voltage detection means and the comparison result by the voltage comparison means, for bringing both the first and second switches into the off-states while the voltage comparison means is performing the voltage comparison operation, and outputs signals for keeping both the first and second switches in the off-states regardless of the discrimination result by the voltage detection means when the generated voltage by the solar cell is smaller than the supply voltage, and outputs signals for bringing both the first and second switches into the on-states if the accumulated voltages exceed preset values. And, also it outputs signals for bringing the first and second switches into the on-state and off-state alternately at predetermined time periods if the accumulated voltages are below the preset values when the generated voltage by the solar cell is larger than the supply voltage.

Thereby, in the quick-start type electronic timepiece with solar cell, the charging efficiency can be also improved.

Incidentally, if a voltage detection command signal is outputted from the time keeping means to the voltage detection means at predetermined intervals and a voltage comparison command signal is outputted from the time keeping means to the voltage comparison means at predetermined intervals, the voltage detection means can intermittently perform the voltage detection operation in synchronization with the voltage detection command signal and the voltage comparison means can intermittently perform the voltage comparison operation in synchronization with the voltage comparison command signal.

In these electronic timepieces, a voltage drop hardly occurs on charging from the solar cell to the accumulator devices, therefore a solar cell consisted of a single cell having a low generated voltage can be also used.

BEST MODES FOR CARRYING OUT THE INVENTION

Figure 1:
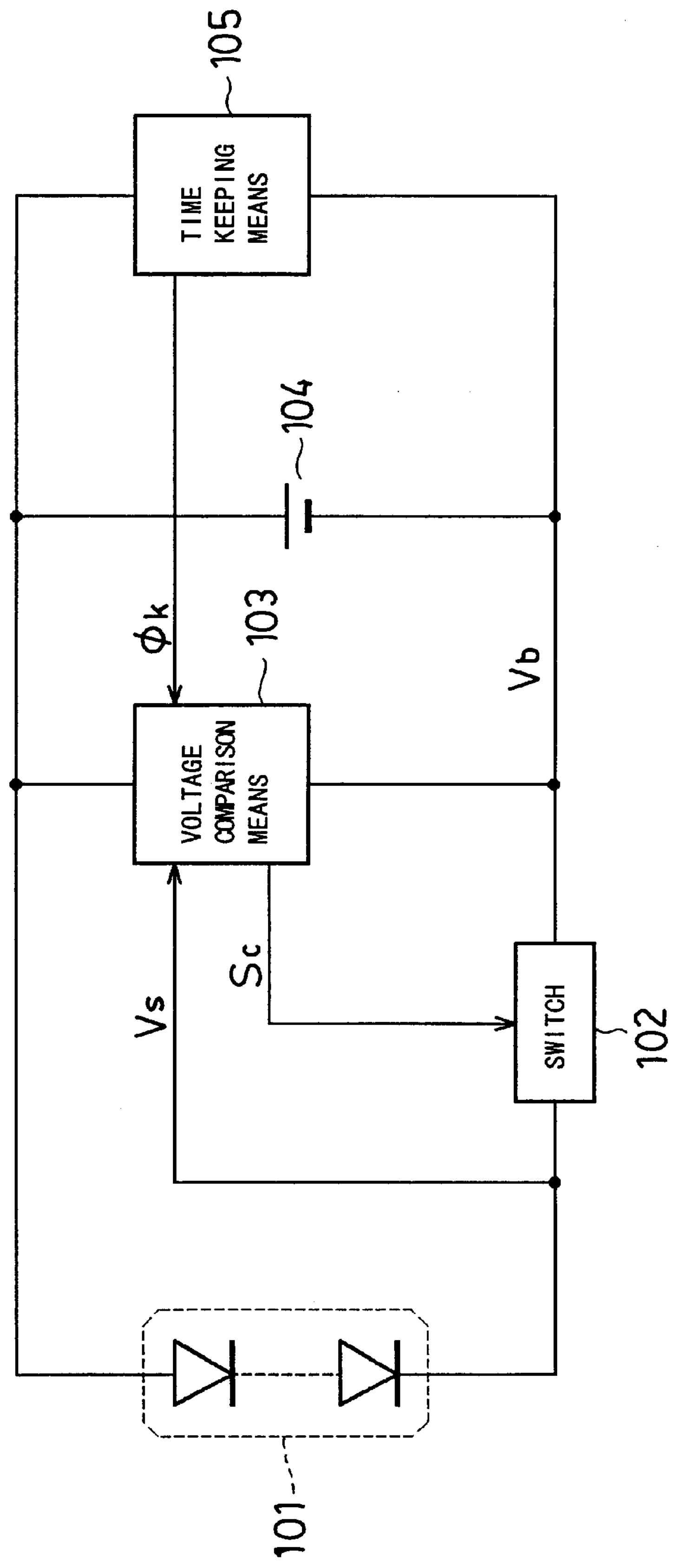
FIG. 1 is a block circuit diagram showing the basic configuration of an embodiment of an electronic timepiece according to the present invention.
Figure 2:
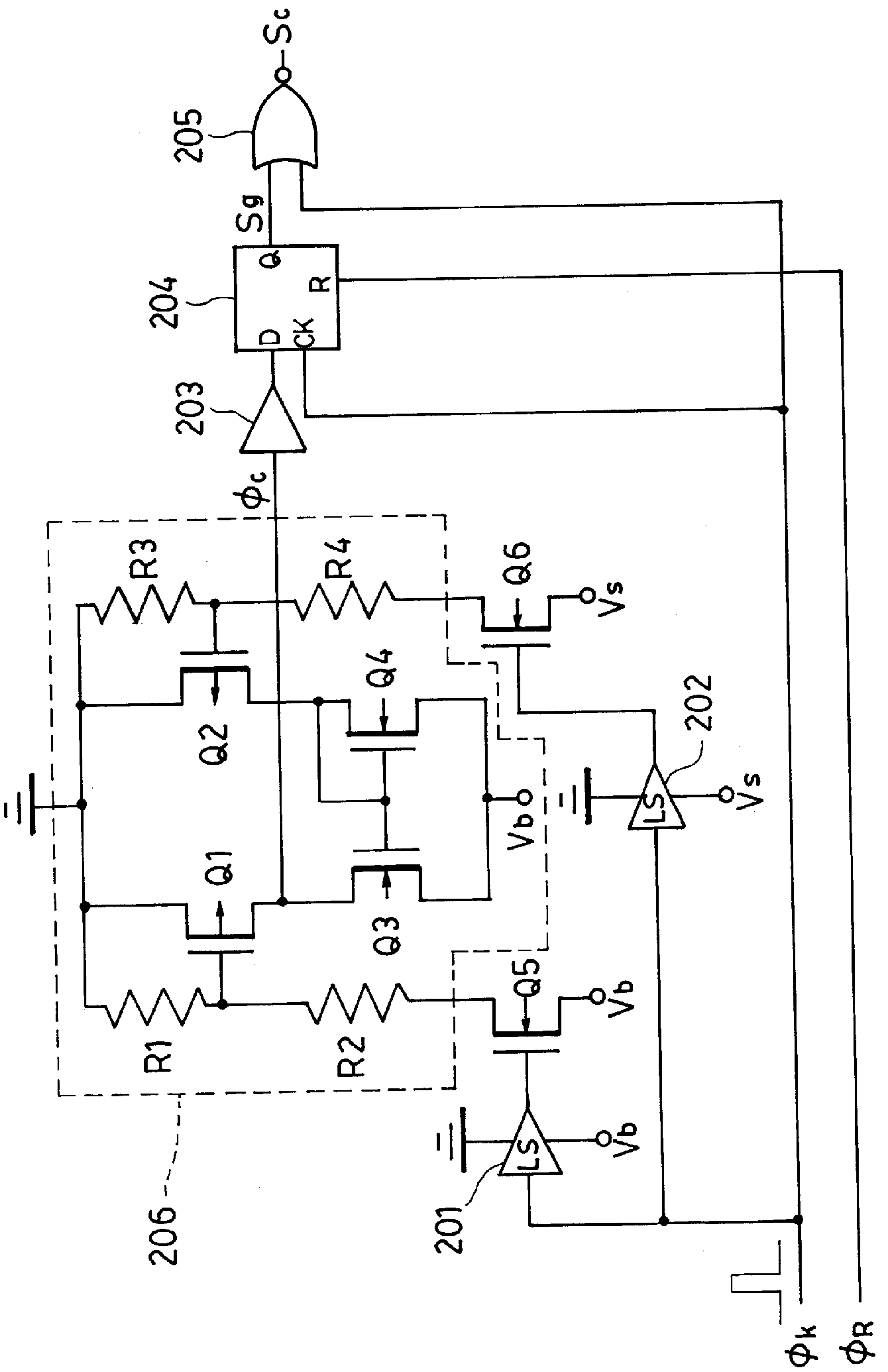
FIG. 2 is a circuit diagram showing a concrete example of a voltage comparison means 103 in FIG. 1.
Figure 3:
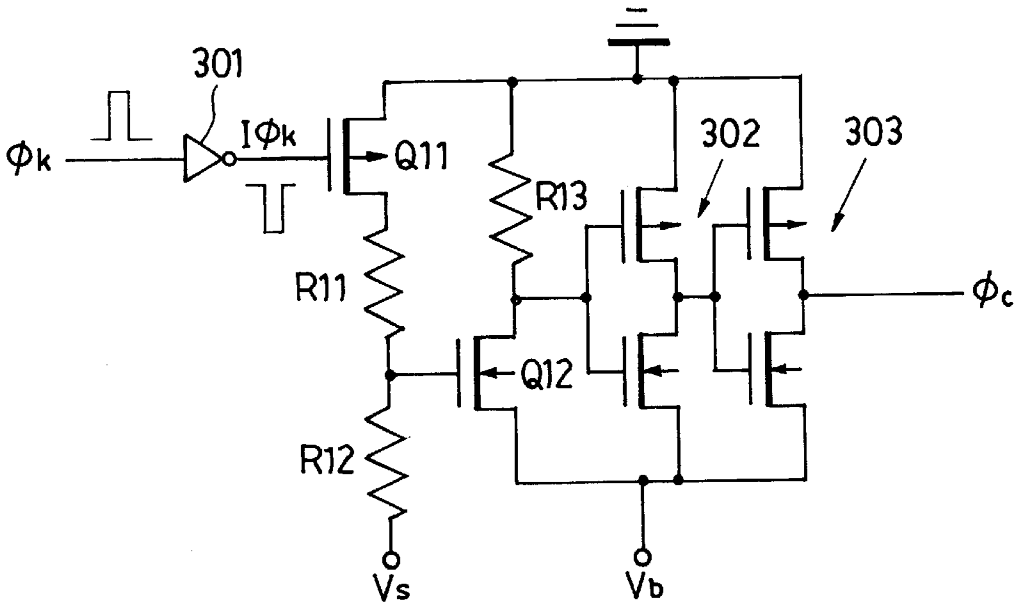
FIG. 3 is a circuit diagram showing another example of the voltage comparison circuit in FIG. 2.

First Embodiment: FIG. 1 to FIG. 3

Hereinafter, the best modes for an electronic timepiece according to the present invention will be explained using the accompanying drawings. First, the first embodiment thereof will be described with reference to FIG. 1 through FIG. 3.

FIG. 1 is a block circuit diagram showing the basic configuration of the first embodiment of an electronic timepiece according to the present invention, and FIG. 2 is a circuit diagram of a concrete example of a voltage comparison means of the electronic thereof. In FIG. 1, the same numerals and symbols as those in FIG. 8 are given for the portions corresponding to those in FIG. 8.

In FIG. 1, for a solar cell 101, used is a thin type device with high efficiency for a wristwatch, for example, a silicon thin film PN junction device or a cadmium sulfide power generating device formed on such as a glass substrate, a ceramic substrate or a steel plate. Alternatively, a photo-thermal power generating device in which a thin film PN junction device is formed on a semiconductor multi-junction thermocouple power generating device can be used.

Figure 8:
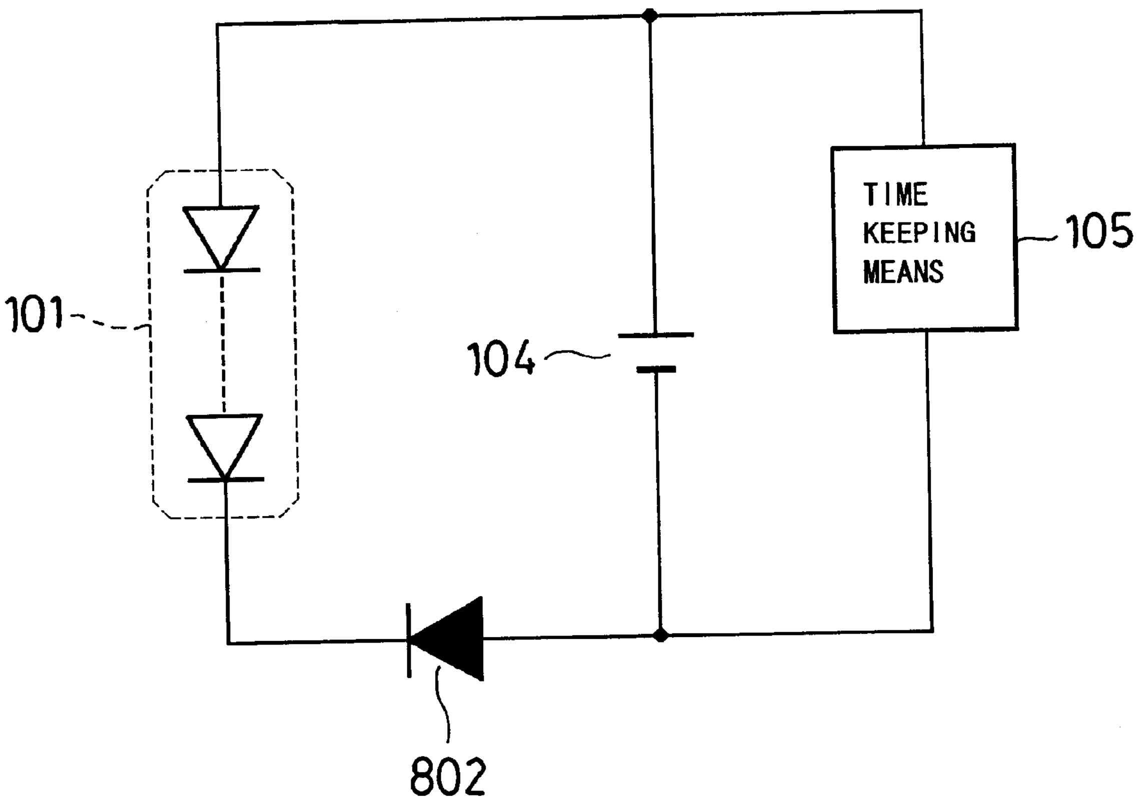
FIG. 8 is a block circuit diagram showing the basic configuration of a conventional electronic timepiece with solar cell.

A time keeping means 105 is an electronic timepiece module, as similarly to that in a conventional embodiment shown in FIG. 8, comprising a time keep counter circuit having a quartz oscillator circuit, an electric counter circuit (frequency dividing circuit) and the like, a digital display or hands and a drive mechanism thereof (a step motor and train gears and the like) for displaying a time and the like, and so on, and kept time information can be inputted therein by means of an external operation member.

The solar cell 101, an accumulator device 104 and the time keeping means 105 are connected one another in parallel. The electric power generated by the solar cell 101 is accumulated (charged) in the accumulator device 104, and the accumulated electric power is supplied to the time keeping means 105, thereby the time keeping means 105 operates to display a time and the like. As the accumulator device 104, which is a power accumulation means, a secondary cell is used in this embodiment, which can be replaced with the use of a condenser (a capacitor) with a large capacitance.

Moreover, in this electronic timepiece, an electrically on-off controllable switch 102 is inserted in a circuit for charging the accumulator device 104 by the solar cell 101, and a voltage comparison means which is fed with electric power from the accumulator device 104 is provided to control on-off states of the switch 102 with a switch control signal Sc of an output of the voltage comparison means.

A voltage comparison means 103 receives a voltage comparison command signal ϕk from the time keeping means 105 at predetermined intervals and intermittently brings the switch 102 into the off-state in synchronization with the voltage comparison command signal ϕk. In the off-state, the voltage comparison means 103 compares a generated voltage Vs by the solar cell 101 and an accumulated voltage (a voltage between terminals) Vb in the accumulator device 104, and stores the comparison result in a memory circuit until the next comparison timing.

Incidentally, when the switch 102 is in the on-state, the generated voltage Vs is pulled by the accumulated voltage Vb such that both are nearly at the same potential (Vs=Vb), which makes it impossible to compare both voltages with each other. Therefore the switch 102 needs to be brought into the off-state to compare the voltages.

In this embodiment, the anode side of the solar cell 101 is grounded, therefore the generated voltage Vs and the accumulated voltage Vb are both negative voltages, but the magnitudes of absolute values thereof are compared with each other.

After the above voltage comparison and storing operation of the comparison result have completed, the opening and closing control of the switch 102 is performed based on the stored comparison result.

More specifically, when $|Vs| \leqq |Vb|$, the switch 102 is brought into the off-state to prevent the occurrence of leakage current from the accumulator device 104 into the solar cell 101. When $|Vs| > |Vb|$, the switch 102 is brought into the on-state to carry out charging of the accumulator device 104.

The reverse flow prevention and the charge control by opening and closing of the switch 102 are both not so urgent, thus even the above intermittent control can sufficiently achieve its purposes. There is an advantage that the operation of the voltage comparison means 103 is intermittently performed as above, thereby the power consumed in the voltage comparison means 103 can be reduced.

The power consumption in a circuit portion of an electronic timepiece on the market is quite small of about 100 nanowatt (nW), therefore it is not permitted that the power consumption substantially increases due to the voltage comparison means 103 added for the present invention.

However, the frequency of the voltage comparison by the voltage comparison means 103 for controlling the switch 102 is, as described above, comparatively low and moreover only quite a short time is required for one voltage comparison, therefore the power consumed in the voltage comparison means 103 is considerably small and possible to limit to several nW.

For example, when the normal power consumption of the voltage comparison means 103 is 1 $\mu$W, the frequency of the voltage comparison operation is once a second, and the period of time required for the voltage comparison is 1 millisecond, the average power consumption is limited to 1 nanowatt which is a value at which the voltage comparison means 103 can be actually installed in a timepiece.

It is preferable to use an MOS field effect transistor (MOS FET) in which a voltage drop does not occur as the switch 102.

In consideration of a great increase in generated power current of the solar cell 101 under direct sunlight, it is advisable to use a switch wide in channel width and low in on-resistance. In this case, it happens that a gate capacitance of an FET becomes large, which makes it difficult to directly drive the switch 102 with a switch control signal Sc outputted from the voltage comparison means 103. In such a case, several pre-drivers for driving the switch are preferably provided.

In FIG. 1, the voltage comparison means 103 and the switch 102 are illustrated as independent blocks of each other. It is possible that these can be integrated in an electronic timepiece module of the time keeping means 105 to form a single IC in order to configure a small system.

A concrete example of the circuit diagram configuration of the voltage comparison means 103 is shown in FIG. 2. A comparison circuit 206 shown in FIG. 2 comprises n-channel MOS FETs Q1 and Q2, p-channel MOS FETs Q3 and Q4, and resistors R1 to R4 and utilizes current mirror operation of the FETs, and is driven with an accumulated voltage Vb as a supply voltage. Equalizing the ratio of the resistor R1 to the resistor R2 in resistance value with the ratio of the resistor R3 to the resistor R4 in resistance value (R1:R2=R3:R4) enables an accumulated voltage Vb and a generated voltage Vs to be compared in voltage.

When a comparison command signal ϕk in a pulse form is at an effective level (the high level "H" in the circuit in FIG. 2), a gate voltage is applied to P-channel MOS FETs Q5 and Q6 through level shifters 201 and 202. The respective FETs Q5 and Q6 are brought into the on-states, which allows an accumulated voltage Vb and a generated voltage Vs to be supplied to the comparison circuit 206. Accordingly, the voltage comparison is carried out in the comparison circuit 206 only during that period of time. The comparison result is outputted as a logical value signal ϕc corresponding to the relation in magnitude of absolute values of both voltages, and inputted into a data terminal D of a flip-flop circuit 204 via a buffer circuit 203.

The flip-flop circuit 204 is a memory circuit which stores the comparison result inputted into the data terminal D in synchronization with a trailing edge of a voltage comparison command signal ϕk inputted into a clock terminal CK, and makes an output signal Sq from an output terminal Q the high level "H" or the low level "L" in accordance with the above result.

As described above, since the switch 102 needs to be kept in the off-state during the comparison operation, an output signal Sq of the voltage comparison result stored in the flip-flop circuit 204 and a voltage comparison command signal ϕk are ANDed to be outputted as a switch control signal Sc by an NOR gate 205.

A reset signal ϕR (or a set signal) is not absolutely necessary, but can directly control a control signal Sc, therefore it is convenient in many cases that the reset signal ϕR is ready to be inputted into a reset terminal R of the flip-flop circuit 204.

In the circuit in FIG. 2, when the comparison command signal ϕk is effective at the high level "H", the output signal Sq of the flip-flop circuit 204 is at the low level "L" with the voltage comparison result of $|Vs|>|Vb|$ and when the voltage comparison command signal ϕk is also at the low level "L", the switch control signal Sc becomes the high level "H". The switch 102 in FIG. 1 is assumed to become the on-state only when the switch control signal Sc is at the high level "H". When $|Vs|=|Vb|$, the switch 102 may be brought into the on-state but it is in the off-state in this embodiment.

Incidentally, in this configuration, the voltage comparison command signal ϕk is a signal at a low voltage level from the time keeping means 105 in FIG. 1, thus it is increased in voltage level by the level shifters 201 and 202 on being inputted into the comparison circuit 206, and drives the buffer circuit 203 and the flip-flop circuit 204 again at a low voltage.

These signal polarities (logical values) and voltage levels thereof can be variously changed in accordance with a system to be realized.

The configuration of the voltage comparison means shown in FIG. 2 is one example, and additionally various configurations can be suggested. For example, a voltage comparison circuit with a simple configuration such as shown in FIG. 3. can be employed in place of the voltage comparison circuit 206 in FIG. 2. Instead of the FETs, a comparison circuit can be configured with bipolar transistors.

In the voltage comparison circuit shown in FIG. 3, when the above described voltage comparison command signal ϕk is inputted and reversed to a signal I ϕk at an inverter 301, which becomes the low level "L", a p-channel MOS FET Q11 is brought into the on-state. Thereby, the generated voltage Vs by the solar cell (negative voltage) is divided at voltage dividing resistors R11 and R12, and an n-channel MOS FET Q12 is controlled in a conduction direction with the divided voltage. When the divided voltage is equal to or more than a threshold value of the FET Q12 (with respect to the accumulated voltage Vb of the accumulator means), the FET Q12 conducts and pulls a pull-up potential by a resistor R13 to the low level "L", which is amplified and shaped via inverter circuits 302 and 303 consisted of complementary MOS-ICs to output a signal at the low level "L" as a logical value signal ϕc of the comparison result.

Accordingly, the threshold value of the FET Q12 (with respect to the accumulated voltage Vb) is compared via the voltage dividing resistors R11 and R12, and only when the absolute value of the generated voltage Vs by the solar cell is sufficiently large (larger than the absolute value of the accumulated voltage Vb) with the signal I ϕk at the low level "L", a logical value signal ϕc at the low level "L" is outputted. It is preferable that the logical value signal ϕc is stored in a memory circuit such as a flip-flop circuit and the like similarly to the case of the voltage comparison means shown in FIG. 2, and the memory output and the voltage comparison command signal ϕk are ANDed by an NOR circuit to output a switch control signal Sc at the high level "H" until the next voltage comparison command signal ϕk is inputted.

Incidentally, to prevent overcharging to an accumulator device in a conventional electronic timepiece with solar cell, a circuit, which detects an accumulated voltage of an accumulator device and controls to force a charging current to bypass the accumulator device when the voltage exceeds a preset value so as to prevent overcharging, is often used.

However, in the case of the electronic timepiece according to the present invention shown in FIG. 1, the switch 102 can also serve for preventing overcharging. More specifically, a detection means for detecting an accumulated voltage (a voltage between terminals) of the accumulator device 104 is provided in addition to the voltage comparison means 103, and when a voltage exceeding a preset value is detected by the detection means, an electric switch is kept in the off-state, thereby preventing overcharging to the accumulator device 104.

In the embodiment shown in FIG. 1, a voltage comparison command signal ϕk is provided from the time keeping means 105, and it is also possible that a CR oscillator or the like is provided in the comparison means 103, where a periodical signal in correspondence with the voltage comparison command signal ϕk is generated.

Figure 4:
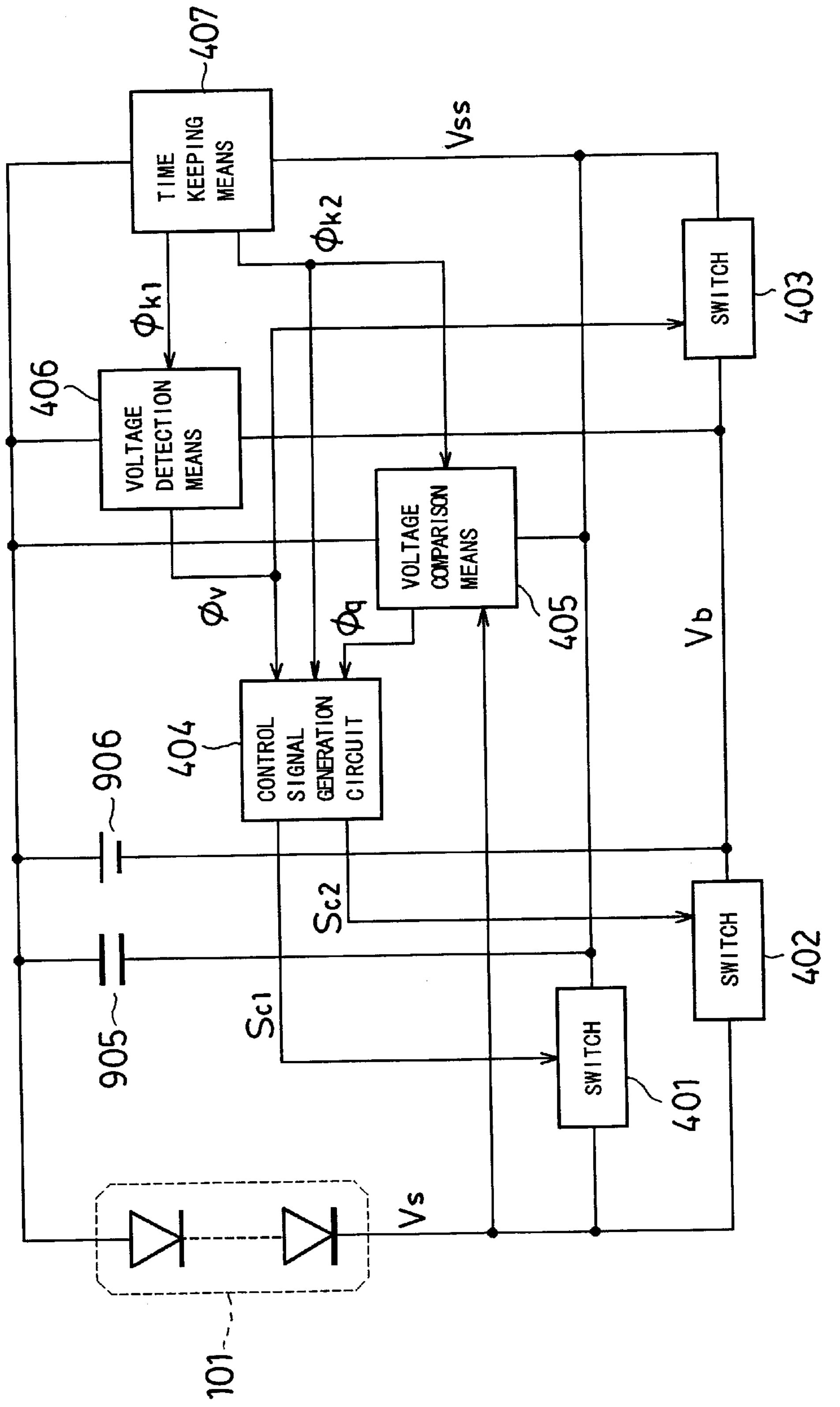
FIG. 4 is a block circuit diagram showing the configuration of a quick-start type electronic timepiece of another embodiment of an electronic timepiece according to the present invention.
Figure 5:
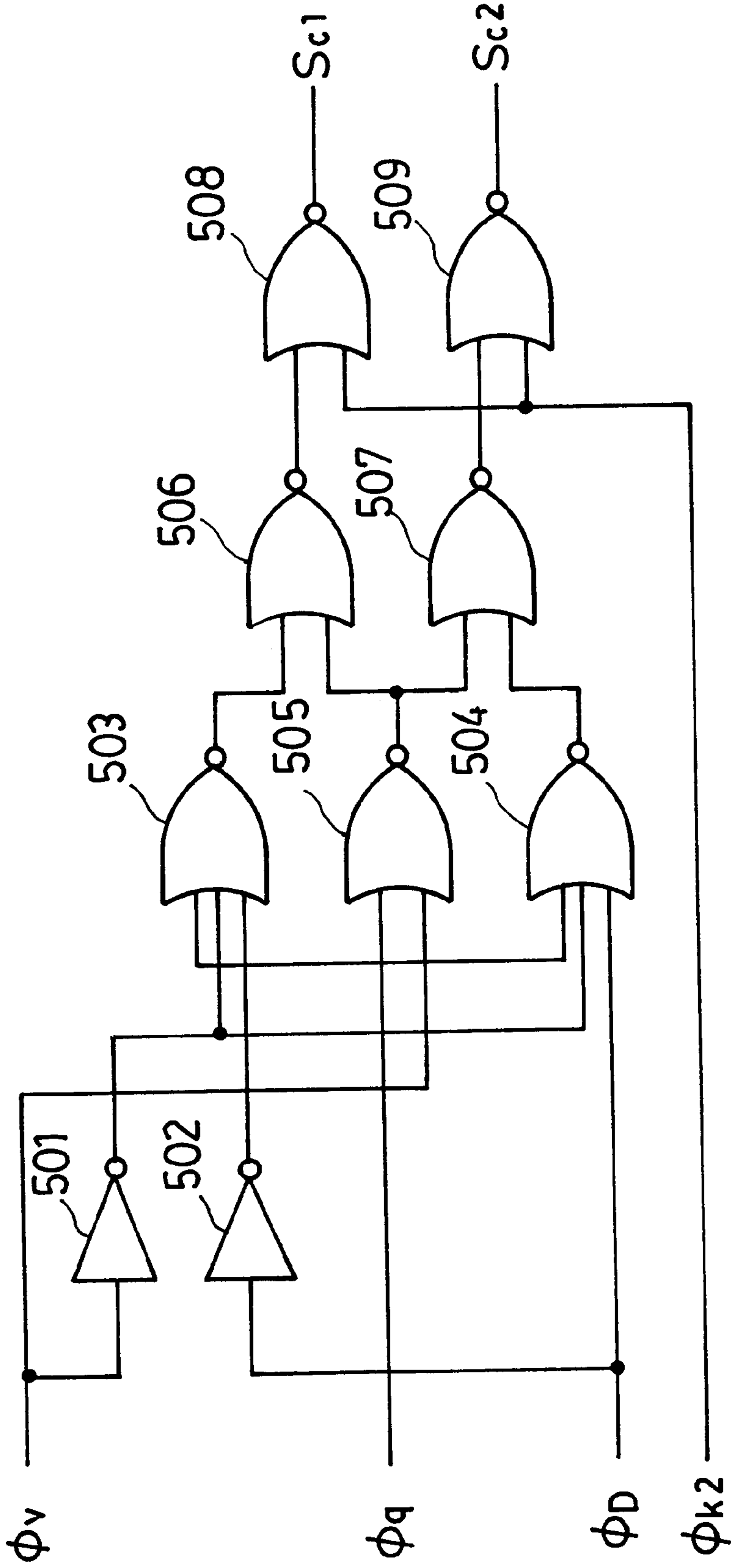
FIG. 5 is a circuit diagram showing a concrete example of a control signal generation circuit in FIG. 4.

Second Embodiment: FIG. 4 and FIG. 5

Next, the second embodiment of an electronic timepiece according to the present invention will be explained with reference to FIG. 4 and FIG. 5. FIG. 4 is a block circuit diagram showing the configuration of a quick-start type electronic timepiece to which the present invention is embodied, and the same numerals and symbols as those in FIG. 9 are given for the same components as those in FIG. 9.

Figure 9:
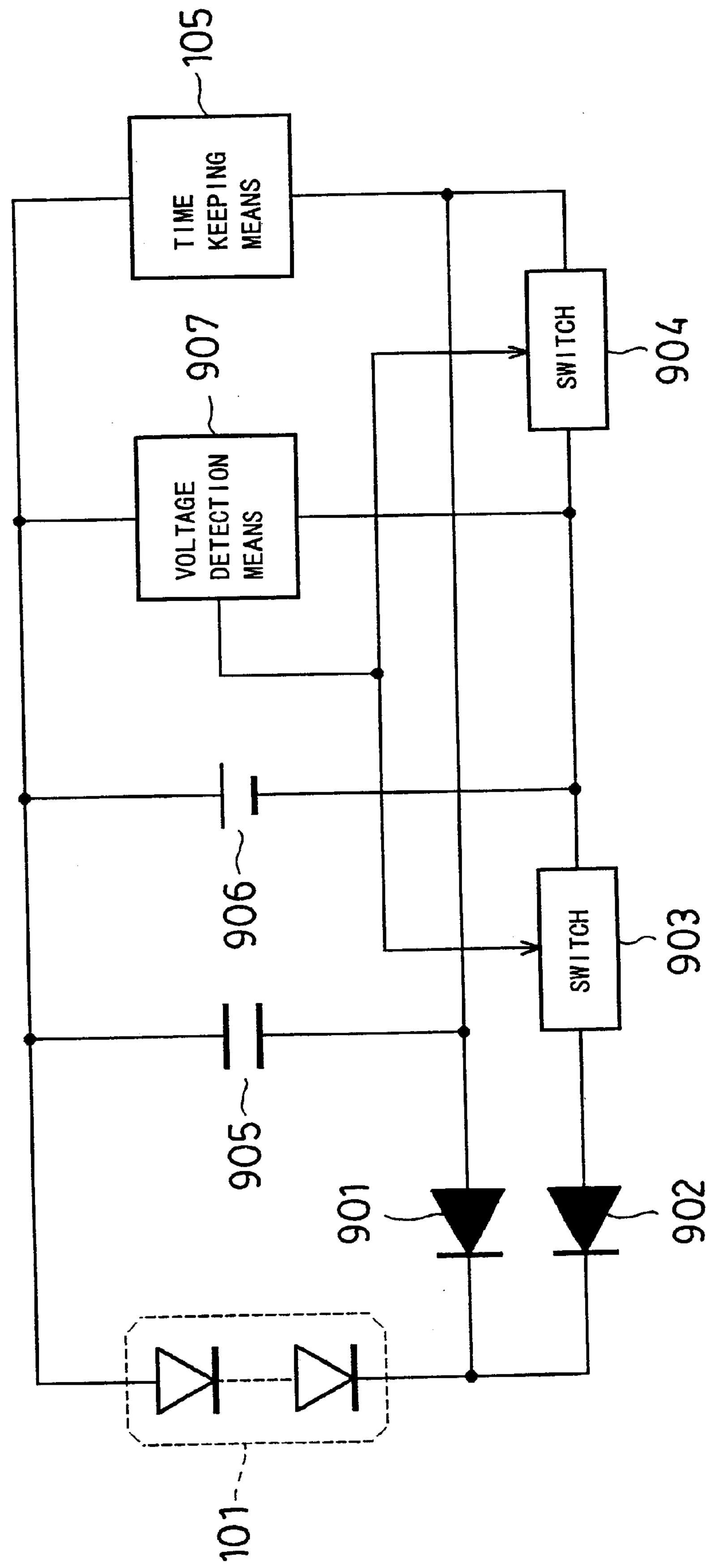
FIG. 9 is a block circuit diagram showing the configuration of a conventional quick-start type electronic timepiece with solar cell.

This electronic timepiece, in which two reverse flow preventing diodes 901 and 902 provided in the respective circuits for charging a small capacitance accumulator device 905 and a large capacitance accumulator device 906 in a conventional timepiece shown in FIG. 9 are respectively replaced with electrically on-off controllable switches 401 and 402 for controlling charging, is configured to control the on-off states of the respective switches with switch control signals Sc1 and Sc2 from a control signal generation circuit 404. Moreover, a voltage detection means 406 and a voltage comparison means 405 are provided to send output signals to the control signal generation circuit 404.

A time keeping means 407 in this embodiment is similar to the time keeping means 105 in FIG. 1 and outputs a voltage detection command signal ϕk1 to the voltage detection means 406 at predetermined intervals and outputs a voltage comparison command signal ϕk2 to the voltage comparison means 405 and the control signal generation circuit 404 at predetermined intervals.

Furthermore, an electrically on-off controllable switch 403 for selecting a power source is also inserted in a supply circuit from the large capacitance accumulator device 906 to the time keeping means 407.

The voltage detection means 406 intermittently detects an accumulated voltage Vb of the large capacitance accumulator device (the secondary cell) 906 in synchronization with a voltage detection command signal ϕk1 from the time keeping means 407, discriminates whether or not the accumulated voltage Vb exceeds a preset value and stores the result until the next detection timing, and outputs a signal ϕv of the discrimination result to the control signal generation circuit 404 and the switch 403.

The voltage comparison means 405 intermittently compares a generated voltage Vs by the solar cell 101 and a supply voltage Vss to the time keeping means 407 by the small capacitance accumulator device 905 or the large capacitance accumulator device 906 in synchronization with a voltage comparison command signal ϕk2 from the time keeping means 407, stores the comparison result until the next voltage comparison timing, and outputs a storage signal ϕq (corresponding to the output signal Sq from the flip-flop circuit 204 in FIG. 2) of the comparison result to the control signal generation circuit 404. For the voltage comparison means 405, for example, a circuit of the voltage comparison means shown in FIG. 2 except for the NOR gate 205 may be used and applied with a supply voltage Vss in place of an accumulated voltage Vb. In this case, the storage signal ϕq of the comparison result corresponds to the output signal Sq from the flip-flop circuit 204 in FIG. 2.

The control signal generation circuit 404 outputs switch control signals Sc1 and Sc2 based on a signal ϕv of the discrimination result from the voltage detection means 406, a storage signal ϕq of the comparison result from the voltage comparison means 405, and a voltage comparison command signal ϕk2 from the time keeping means 407 to control the two switches 401 and 402.

In other words, when $|Vs| \leqq |Vss|$ as a result of the voltage comparison by the voltage comparison means 405, the switches 401 and 402 are both kept in the off-states regardless of the discrimination result of an accumulated voltage Vb by the voltage detection means 406. When $|Vs| > |Vss|$, according to the discrimination result of the accumulated voltage Vb by the voltage detection means 406, the switches 401 and 402 are both brought into the on-states if the accumulated voltage Vb exceeds a preset value, and the switches 401 and 402 are controlled to repeat on-off states by turns at predetermined ratios of period of time if the accumulated voltage Vb below the preset value.

However, the voltage comparison and the storage of the comparison result by the voltage comparison means 405 are performed in synchronization with a voltage comparison command signal ϕk2 from the time keeping means 407, where the switches 401 and 402 are in the off-states during the comparison operation.

The control signal generation circuit 404 is a circuit which generates switch control signals Sc1 and Sc2 for the switches 401 and 402 based on a signal ϕv of the discrimination result of the accumulated voltage Vb, a storage signal ϕq of the comparison result of the generated voltage Vs and the supply voltage Vss by the voltage comparison means 405, and a voltage comparison command signal ϕk2 from the time keeping means 407, and can be configured as shown in FIG. 5.

The control signal generation circuit shown in FIG. 5 is a circuit where the ϕv becomes the high level when the accumulated voltage Vb exceeds a preset value, the ϕq becomes the high level when $|Vs| \leqq |Vss|$ with insufficient ambient light, and the switch control signals Sc1 and Sc2 are both at the high level to bring the switches 401 and 402 into the on-states.

This circuit comprises two inverters 501 and 502, two three-input NOR gates 503 and 504, and five two-input NOR gates 505 to 509. A ϕD in FIG. 5 is a signal which sets ratios between on-states and off-states (duty) of the switches 401 and 402.

The signal ϕD, power lines of the control signal generation circuit 404 and the like are omitted in FIG. 5 to avoid complication in the drawing.

The switch 403 for selecting a power source of the time keeping means, similarly to the conventional embodiment shown in FIG. 9, is controlled with a signal ϕv of the discrimination result of the accumulated voltage Vb of the large capacitance accumulator device 906, and the switch 403 is kept in the on-state if Vb exceeds a preset value, but otherwise it is kept in the off-state. The switch 403 does not need to be brought into the off-state during the voltage detection by the voltage detection means 406. However, the voltage detection is intermittently performed in synchronization with a voltage detection command signal ϕk1 from the time keeping means 407, thereby holding the power required for the voltage detection small.

The voltage detection command signal ϕk1 and the voltage comparison command signal ϕk2 can be set at respective independent timings, and the same signals can be used if the conditions of power consumption and the like permit. Incidentally, these signals ϕk1 and ϕk2 are obtained from the time keeping means 407, and it can be possible that CR oscillator circuits and the like are provided in the voltage detection means 406 and the voltage comparison means 405, and periodic signals corresponding to the signals ϕk1 and ϕk2 are respectively produced in the voltage detection means 406 and the voltage comparison means 405.

Furthermore, it is also possible that the voltage detection means 406, the voltage comparison means 405, the control signal generation circuit 404, and the switches 401, 402, and 403 are all integrated into the electronic timepiece module of the time keeping means 407 to form a single IC in order to configure a small system.

Figure 6:
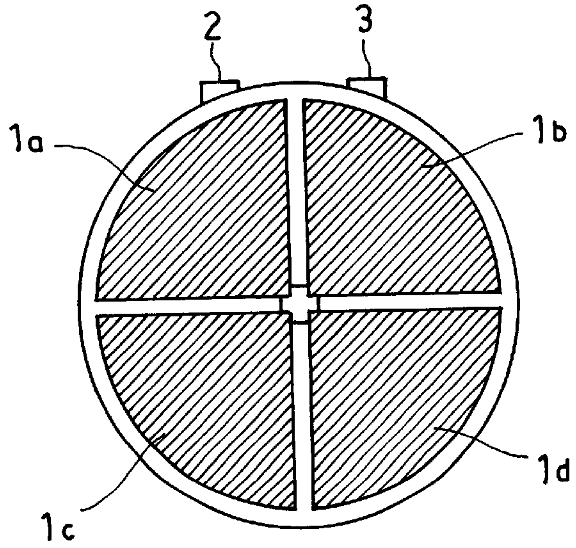
FIG. 6 is a plan view showing a shape example of a solar cell consisted of four-cell connected in series used in the embodiment of the electronic timepiece according to the present invention.
Figure 7:
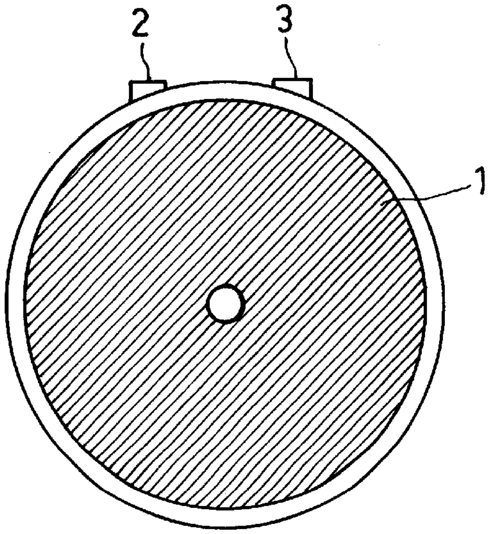
FIG. 7 is a plan view showing a shape example of a solar cell consisting of a single cell similarly to the above.

Regarding a Solar Cell: FIG. 6 and FIG. 7

The generated voltage by a single cell in a solar cell device is generally about 0.5 volts to 0.7 volts. When the above single cell is used for an electronic timepiece, a plurality of the cells (generally about four cells) connected in series are used for securing a sufficient generated voltage. An example of the shape of a four-cell series-type solar cell is shown in FIG. 6. In this example, 1/4 round shaped cells 1*a*, 1*b*, 1*c*, and 1*d* each of which is made from a round cell being equally divided into four parts, are connected in series and both ends thereof are connected to electrodes 2 and 3.

The solar cell such as shown in FIG. 6 can be also used for the solar cell 101 in the electronic timepiece shown in FIG. 1 and FIG. 4 described above.

However, there are the following disadvantages in such a type of a solar cell in which a plurality of the above-described cells are used in series.

(1) When even one of a plurality of cells is in a shaded area because of being hidden behind a sleeve or the like, the generated voltage drops, which makes charging impossible even if the other cells are supplied with the sufficient amount of light.

(2) Partitions between respective cells are different in color from the cells themselves, which spoils appearances when the partitions are provided on the display face.

(3) When it is required to open a hole on the display face in a digital-analog combination timepiece, a multi-function timepiece, or the like, it is quite difficult to determine a position to open the hole, since the generated voltage drops unless each cell has about the same area.

These disadvantages can be all solved by the use of a solar cell comprising a single cell 1 without parting lines such that shown in FIG. 7. However, in this case, it is a problem whether the generated voltage by the solar cell of the single cell can drive the time keeping means.

In recent years, it has become possible to fabricate a transistor in which a threshold voltage is decreased to about 0.4 volts and additionally the leakage current is reduced by the introduction of a new processing art for a silicon IC and by progress in miniature processing thereof.

Furthermore, if a wafer having an SOI (Silicon On Insulator) structure in which thin film semiconductor silicon is formed on an insulating substrate which recently came into practical use is used, it is possible to fabricate a transistor with a lower threshold voltage.

Accordingly, by constructing an oscillator circuit, a counter circuit and the like of a time keeping means, using such a transistor with a low threshold voltage, it is possible in terms of the device that a solar cell such as the single cell shown in FIG. 7 charges an accumulator device, from which the electric power drives a time keeping means.

In a conventional electronic timepiece with solar cell, however, when a solar cell charges an accumulator device with the generated power, a voltage drop due to a reverse flow preventing diode occurs as described above, therefore when a solar cell of a single cell with a generated voltage about 0.5 V to 0.7 V is used, the accumulated voltage lowers close to zero volts, which makes it completely impossible to drive a time keeping means.

Whereas, in each of the electronic timepieces of the first and second embodiments of the present invention described above, an electronic switch with little voltage drop in the on-state is used in place of a reverse flow preventing diode, which makes it possible to realize an electronic timepiece having a solar cell of a single cell as a power source.

The circuit configuration of the electronic timepiece in that case is the same as that of the embodiment shown in FIG. 1 or FIG. 4, except for the solar cell 101 being consisted of the single cell as shown in FIG. 7, and the workings of the charging control is the same as that of the aforesaid embodiments, thus the description will be omitted.

In this case, a time keep counter circuit of a time keeping means is consisted of the transistor having a low threshold voltage explained above, which makes it possible to drive the time keep counter circuit as in the conventional configuration.

In an electronic timepiece with an analog display, with regard to an electro-mechanical force conversion device, the conventional one can not be used as it is. However, if the electro-mechanical force conversion device in which the number of windings and the like are adjusted to be adequate for a low voltage, it becomes possible to drive an entire time keeping means even with the low voltage generated by a solar cell consisting of a single cell accumulated in the accumulator device.

When the conventional electro-mechanical force conversion device is required to be used as it is, it is advisable that the accumulated voltage in the accumulator device is boosted by a voltage-up converter to increase the voltage, and the electro-mechanical force conversion device is driven with the boosted voltage.

Furthermore, also in the electronic timepiece with a digital display, it is preferable that in portions requiring a high voltage for driving a liquid crystal or the like, a required voltage is generated using a voltage-up converter similarly to the above, and the portions are driven with the generated voltage.

Industrial Applicability

In an electronic timepiece according to the present invention, an electronic switch with little voltage drop in the on-state is used to prevent a reverse flow of an electric current from an accumulator device to a solar cell without providing a reverse flow preventing diode in a circuit for charging the accumulator device by the solar cell, so that when the accumulator device is charged with the generated voltage by the solar cell, the switch is brought into the on-state and a voltage drop does not occur, which makes it possible to charge the generated voltage by the solar cell to the electric power accumulation device without loss. In a quick-start type electronic timepiece, the charging efficiency can be similarly enhanced.

Furthermore, an electronic timepiece using a solar cell consisted of a single cell can be realized, consequently, the various disadvantages in using a solar cell of a plurality of cells in series-type can all be solved.

What is claimed is:

1. An electronic timepiece having a solar cell and an accumulator device, in which electric power generated by said solar cell is accumulated in said accumulator device and a time keeping means is driven with the accumulated electric power, said electronic timepiece comprising:

an electrically on-off controllable switch being provided in a circuit for charging said accumulator device by said solar cell; and a voltage comparison means for comparing a generated voltage by said solar cell with an accumulated voltage in said accumulator device while said switch is intermittently kept in an off-state at predetermined intervals, for storing the comparison result until the next voltage comparison, and for keeping said switch in the off-state when the generated voltage is smaller than the accumulated voltage, or for bringing said switch into the on-state when the generated voltage is larger than the accumulated voltage.

2. The electronic timepiece according to claim 1, wherein a voltage comparison command signal is outputted from said time keeping means to said voltage comparison means at predetermined intervals.

3. The electronic timepiece according to claim 1, wherein said solar cell is consisted of a single cell.

4. An electronic timepiece having a solar cell, a first accumulator device with a small capacitance, and a second accumulator device with a large capacitance, in which electric power generated by said solar cell is accumulated in said first accumulator device and said second accumulator device and a time keeping means is driven with the accumulated electric power, said electronic timepiece comprising:

first and second switches each electrically on-off controllable being interposed in circuits for charging said first and second accumulator devices respectively by said solar cell;

a third electrically on-off controllable switch being interposed in a supply circuit to said time keeping means by said accumulator device with a large capacitance;

a voltage detection means for intermittently detecting accumulated voltages in said accumulator devices at predetermined intervals to discriminate whether or not the accumulated voltages exceed preset values, and for outputting a signal for bringing said third switch into the on-state when the accumulated voltages exceed the preset values and outputting a signal for bringing said third switch into the off-state when the accumulated voltages do not exceed the preset values;

a voltage comparison means for intermittently comparing a generated voltage by said solar cell and a supply voltage to said time keeping means at predetermined intervals, and for storing the comparison result until the next voltage comparison; and a control signal generation circuit for outputting signals for bringing both said first and second switches into the off-states while said voltage comparison means is performing the voltage comparison operation, and for outputting signals for keeping both said first and second switches in the off-states regardless of the discrimination result by said voltage detection means when the generated voltage by said solar cell is smaller than the supply voltage, and for outputting signals for bringing both said first and second switches into the on-states if the accumulated voltages exceed preset values and for outputting signals for bringing said first and second switches into on- and off-states alternately at predetermined rates of period of time if the accumulated voltages are below the preset values when the generated voltage by said solar cell is larger than the supply voltage, based on the discrimination result by said voltage detection means and the comparison result by said voltage comparison means.

5. The electronic timepiece according to claim 4, wherein a voltage detection command signal is outputted from said time keeping means to said voltage detection means at predetermined intervals, and a voltage comparison command signal is outputted from said time keeping means to said voltage comparison means at predetermined intervals.

6. The electronic timepiece according to claim 4, wherein said solar cell is consisted of a single cell.

* * * * *

UNITED STATES PATENT AND TRADEMARK OFFICE

CERTIFICATE OF CORRECTION

PATENT NO. : 6,301,198 B1
DATED : October 9, 2001
INVENTOR(S) : Otaka et al.

It is certified that error appears in the above-identified patent and that said Letters Patent is hereby corrected as shown below:

Title page,
Item [22], change the PCT filing date, from Dec. 11, 1995 to read -- Dec. 11, 1998 --

Signed and Sealed this

Eighteenth Day of June, 2002

*Attest:*

JAMES E. ROGAN

*Attesting Officer*

*Director of the United States Patent and Trademark Office*